United States Patent
Zeng et al.

(10) Patent No.: US 7,869,498 B2
(45) Date of Patent: Jan. 11, 2011

(54) LOW POWER DECISION FEEDBACK EQUALIZATION (DFE) THROUGH APPLYING DFE DATA TO INPUT DATA IN A DATA LATCH

(75) Inventors: Yi Zeng, Fremont, CA (US); Freeman Zhong, San Ramon, CA (US); Peter Windler, Fort Collins, CO (US)

(73) Assignee: LSI Corporation, Milpitas, CA (US)

( * ) Notice: Subject to any disclaimer, the term of this patent is extended or adjusted under 35 U.S.C. 154(b) by 993 days.

(21) Appl. No.: 11/709,568

(22) Filed: Feb. 21, 2007

(65) Prior Publication Data

US 2008/0198916 A1 Aug. 21, 2008

Related U.S. Application Data

(60) Provisional application No. 60/845,153, filed on Sep. 14, 2006.

(51) Int. Cl.
*H03H 7/40* (2006.01)
(52) U.S. Cl. .................. 375/233; 375/229; 375/230; 375/231; 375/232
(58) Field of Classification Search .................. 375/224, 375/232–233, 346
See application file for complete search history.

(56) References Cited

U.S. PATENT DOCUMENTS

| | | | |
|---|---|---|---|
| 5,157,690 A | 10/1992 | Buttle | |
| 5,414,733 A | 5/1995 | Turner | |
| 5,440,583 A | 8/1995 | Koike | |
| 5,594,756 A | 1/1997 | Sakurai et al. | |
| 6,226,323 B1 | 5/2001 | Tan et al. | |
| 6,438,164 B2 | 8/2002 | Tan et al. | |
| 6,807,229 B1 | 10/2004 | Kim et al. | |
| 7,606,301 B2 * | 10/2009 | Aziz | 375/233 |
| 2004/0196933 A1 * | 10/2004 | Shan et al. | 375/346 |
| 2005/0238093 A1 * | 10/2005 | Payne et al. | 375/224 |
| 2006/0239341 A1 * | 10/2006 | Marlett et al. | 375/233 |

OTHER PUBLICATIONS

Le, M.Q et al., An adaptive noise-predictive decision-feedback equalizer for themagnetic recording channel, 1999, on pp. 560-563.
Chiani, M; Introducing erasures in decision-feedback equalization to reduce error propagation, Communications, IEEE Transactions,Jul. 1997, on pp. 757-760, vol. 45 Issue 7.

* cited by examiner

*Primary Examiner*—Mohammad H Ghayour
*Assistant Examiner*—Eboni Giles
(74) *Attorney, Agent, or Firm*—Raj Ashyanker, P.C.

(57) ABSTRACT

Low power decision feedback equalization (DFE) through applying DFE data to input data in a data latch is disclosed. In one embodiment, a decision feedback equalization (DFE) system to remove a post cursor intersymbol interference (ISI) through feeding back previous data scaled with adaptive weights to the DFE system, with each slice of the DFE system may include a first set of decision feedback digital to analog converters (DACs) to generate a first DFE data obtained through the feeding back the previous data scaled with the adaptive weights and a first data latch to generate an output data of the each slice through applying the first DFE data to an input data of the each slice in the first data latch to remove a first delay caused by performing the applying the first DFE data to the input data of the each slice outside of the first data latch.

12 Claims, 7 Drawing Sheets

LOW POWER DECISION FEEDBACK EQUALIZATION (DFE) THROUGH APPLYING DFE DATA TO INPUT DATA IN A DATA LATCH

CLAIM OF PRIORITY

This application claims priority from provisional application 60/845,153 titled "a low power decision feedback equalization using data latch with summing capacity" filed on Sep. 14, 2006.

FIELD OF TECHNOLOGY

This disclosure relates generally to the technical fields of hardware, and in one embodiment, to a method and a system of low power decision feedback equalization (DFE) through applying DFE data to input data in a data latch.

BACKGROUND

A decision feedback equalization (e.g., DFE in abbreviation) may remove an intersymbol interference (e.g., ISI in abbreviation), which may result from loss mechanisms in copper traces on printed circuit boards. The loss mechanism may include a skin effect (e.g., a tendency of an alternating electric current (AC) to distribute itself within a conductor so that a density of the AC near a surface of the conductor may be greater than the AC of a core of the conductor), a dielectric loss, reflections from impedance discontinuities.

The DFE may use clean decisions of previously received symbols to remove the ISI in a current symbol. In a process of the DFE, previous data decisions may be fed back, scaled with an adaptive weight, and subtracted from an incoming data (e.g., a received data). A data latch may be driven by a sampling clock and make a data decision based on its input obtained by subtracting a decision feedback voltage from the incoming data. A current decision may be used again to generate another decision feedback voltage for next decision. A generation of the decision feedback voltage may need some settling time (e.g., to convert a digital signal to an analog signal), and/or the summing stage may have its own delay.

For a reliable operation of the DFE, a bandwidth of the data latch and/or the summing stage may need to be high (e.g., a time to complete a process may need to be less than 1 unit interval) to guarantee an overall small settling time, thus consuming a large amount of power. In addition, the time to complete the process may cause a constraint to realize a maximal operation speed which may be allowed for the DFE. Furthermore, an additional silicon area may be needed to construct a circuit (e.g., which may be complex) to generate the decision feedback voltage, convert the decision feedback voltage from digital to analog, and subtract the decision feedback voltage from the incoming data.

SUMMARY OF THE DISCLOSURE

Low power decision feedback equalization (DFE) through applying DFE data to input data in a data latch is disclosed. In one aspect, each slice of a decision feedback equalization (DFE) system to remove a post cursor intersymbol interference includes a first set of decision feedback digital to analog converters (DACs) to generate a first DFE data through applying adaptive weights to previous data and a first data latch to generate an output data of the each slice through applying the first DFE data to an input data of the each slice in the first data latch to remove a first delay caused by performing the applying the first DFE data to the input data of the each slice outside of the first data latch.

In addition, the input data of a pseudo-differential input to reject a DC common-mode voltage and/or a fully-differential input to reject the DC common-mode voltage and/or a dynamic common-mode voltage. Furthermore, the DFE system may also include a second set of decision feedback DACs to generate a second DFE data through applying the adaptive weights and a negative threshold value to the previous data and a second data latch to generate a negative error data of the each slice through applying the second DFE data to the input data of the each slice in the second data latch to remove a second delay caused by performing the applying the second DFE data to the input data outside of the second data latch.

Moreover, the DFE system may further include a third set of decision feedback DACs to generate a third DFE data through applying the adaptive weights and a positive threshold value to the previous data and a third data latch to generate a positive error data of the each slice through applying the third DFE data to the input data of the each slice in the third data latch to remove a third delay caused by performing the applying the third DFE data to the input data outside of the third data latch.

Similarly, the DFE system may include a clock and a data recovery circuit to generate an optimum location to sample the input data based on the output data, the negative error data, and/or the positive error data. The DFE system may also include an adaptor circuit to adjust the adaptive weights based on the output data, the negative error data, and/or the positive error data as the adaptive weights may be amounts of ISI injects of the previous data to the input data.

Also, the DFE system may include a phase interpolator to adjust a timing of the clock based on a voltage controlled oscillator (VCO) as the timing obtained through the clock and data recovery circuit may control sampling of the input data. Moreover, an average power consumption of the DFE system may be lowered by 2 to 3 mili-volts per each of the first data latch, the second data latch, and/or the third data latch when compared to the DFE system with additional circuits to perform the applying the first DFE data, the second DFE data, and/or the third DFE data to the input data.

The DFE system may include four parallel DFE circuits with each of the four parallel DFE circuits may be based on the each slice to recover the input data in 6.4 giga-bits per second (GB/s) with the VCO of the each slice to have a 1.6 GHz ring oscillator. Furthermore, the timing of the clock may be delayed by one tap clock rate between any two adjacent circuits of the four parallel DFE circuits.

In another aspect, a data latch circuit of a decision feedback equalization (DFE) system may include a parallel p-channel metal-oxide-semiconductor field-effect transistor (PMOS) pair with sources of the parallel PMOS pair coupled to a chipset voltage and gates of the parallel PMOS pair coupled to a second clock to pre-charge drains of the parallel PMOS pair to the chipset voltage during a first stage of clocking of the data latch circuit, a two parallel n-channel metal-oxide-semiconductor field-effect transistor (NMOS) pairs with sources of the two parallel NMOS pairs coupled to a drain of a first clock, drains of the two parallel NMOS pairs coupled to the drains of the PMOS pair, and gates of the two parallel NMOS pairs coupled to a differential input voltage and differential DFE data to sink a current during a second stage of the clocking of the data latch, cross-coupled PMOS pair to generate a positive feedback to the two parallel NMOS pair and the another NMOS pair during the second stage and a cross-coupled NMOS pair to escalate the positive feedback during a third stage of the clocking of the data latch and a S-R latch to generate a signal data based on the positive feedback, as the first clock, the second clock, and the third clock may be low during the first stage, the first clock and the second clock may be high but the third clock is low during the second stage, and the first clock is low but the second clock and the third clock may be high during the third stage.

In addition, the signal data may be an output data obtained through subtracting the DFE voltage from the differential voltage input. Furthermore, the signal data may be a negative error data obtained through subtracting the DFE voltage and a negative threshold voltage from the differential input voltage.

Moreover, the signal data may be a positive error data through subtracting the DFE voltage and/or a positive threshold voltage from the differential input voltage. Also, the data latch circuit may also include a threshold decision feedback digital to analog converters (DACs) to generate the negative threshold voltage and/or the positive threshold voltage. Furthermore, the data latch circuit may integrate a first current induced by the input data and a second current induced by the DFE voltage during the second stage.

In yet another aspect, a method of decision feedback equalization (DFE) system includes applying DFE data to differential input data during a clocking of a data latch through directly coupling decision feedback digital to analog converters which generate the DFE data to the data latch to remove a delay due to having the applying the decision feedback equalization data to the differential input data outside of the data latch and generating an output data obtained through the applying the decision feedback equalization data to the differential input data to remove an intersymbol interference associated with the differential input data.

In addition, the method may include generating an error data through applying a threshold data and/or previous data weighed by ISI injects associated with the previous data to the differential input data. Moreover, the method may further include locating an optimal location to sample the differential input data using a clock and data recovery circuit based on the differential input and/or the error data.

Also, DFE digital to analog converters (DACs) generating the DFE data may be shared by the data latch generating the output data and the data latches generating the error data such that a power consumption on of the DFE system may be decreased by at least 20 percent. A die space of the DFE system may be reduced by 5% by removing 50% of the DFE DACs of the DFE system.

The methods, systems, and devices disclosed herein may be implemented in any means for achieving various aspects, and may be executed in a form of a machine-readable medium embodying a set of instructions that, when executed by a machine, cause the machine to perform any of the operations disclosed herein. Other features will be apparent from the accompanying drawings and from the detailed description that follows.

BRIEF DESCRIPTION OF THE DRAWINGS

Example embodiments are illustrated by way of example and not limitation in the figures of the accompanying drawings, in which like references indicate similar elements and in which.

Figure 1:
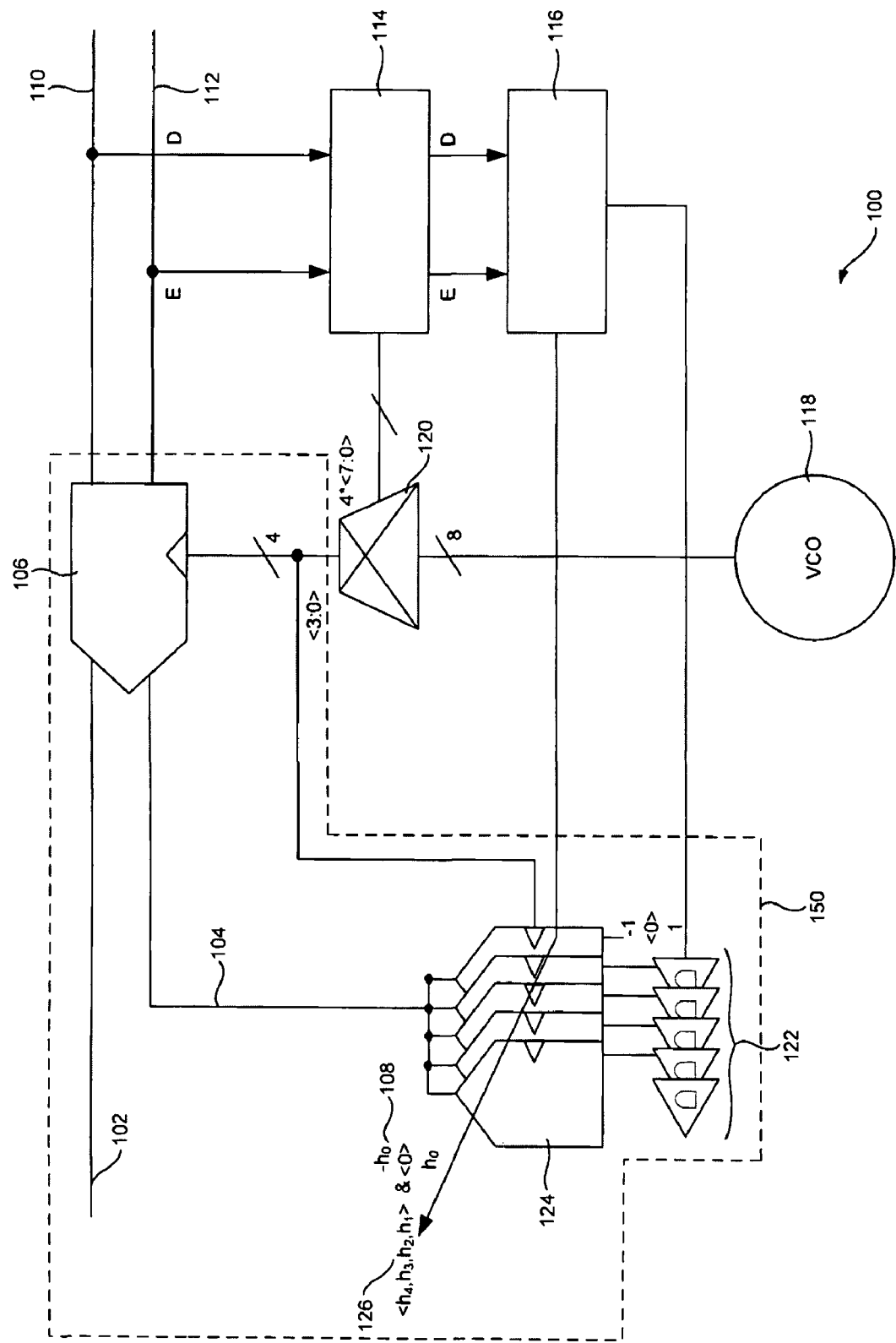
FIG. 1 is a system view of decision feedback equalization (DFE), according to one embodiment.

Other features of the present embodiments will be apparent from the accompanying drawings and from the detailed description that follows.

DETAILED DESCRIPTION

Low power decision feedback equalization (DFE) through applying DFE data to input data in a data latch is disclosed. In the following description, for the purposes of explanation, numerous specific details are set forth in order to provide a thorough understanding of the various embodiments. It will be evident, however to one skilled in the art that the various embodiments may be practiced without these specific details.

In one embodiment, a decision feedback equalization (DFE) system to remove a post cursor intersymbol interference (ISI) through feeding back previous data scaled with adaptive weights to the DFE system, with each slice of the DFE system includes a first set of decision feedback digital to analog converters (DACs) to generate a first DFE data obtained through the feeding back the previous data scaled with the adaptive weights and a first data latch to generate an output data of the each slice through applying the first DFE data to an input data of the each slice in the first data latch to remove a first delay caused by performing the applying the first DFE data to the input data of the each slice outside of the first data latch.

In another embodiment, a data latch circuit of a decision feedback equalization (DFE) system includes a parallel p-channel metal-oxide-semiconductor field-effect transistor (PMOS) pair with sources of the parallel PMOS pair coupled to a chipset voltage and gates of the parallel PMOS pair coupled to a second clock to pre-charge drains of the parallel PMOS pair to the chipset voltage during a first stage of clocking of the data latch circuit, two parallel n-channel metal-oxide-semiconductor field-effect transistor (NMOS) pairs with sources of the two parallel NMOS pairs coupled to a drain of a first clock, drains of the two parallel NMOS pairs coupled to the drains of a PMOS pair, and gates of the two parallel NMOS pairs coupled to a differential input voltage and/or a differential DFE data to sink a current during a second stage of the clocking of the data latch, a cross-coupled PMOS pair to generate a positive feedback to the two parallel NMOS pair and the another NMOS pair during the second stage and a cross-coupled NMOS pair to escalate the positive feedback during a third stage of the clocking of the data latch and a S-R latch to generate a signal data based on the positive feedback, wherein the first clock, the second clock, and a third clock may be low during the first stage, the first clock and the second clock are high but the third clock is low during the second stage, and the first clock is low but the second clock and the third clock are high during the third stage.

In yet another embodiment, a method of decision feedback equalization (DFE) system includes applying DFE data to differential input data during a clocking of a data latch through directly coupling decision feedback digital to analog converters generating the DFE data to the data latch to remove a delay due to having the applying the DFE data to the differential input data outside of the data latch and generating an output data obtained through the applying the decision feedback equalization data to the differential input data to remove an intersymbol interference associated with the differential input data.

FIG. 1 is a system view of decision feedback equalization (DFE) 100, according to one embodiment. Particularly, FIG. 1 illustrates an input data 102, a decision feedback equalization (DFE) data 104, a data latch 106, a threshold data 108, an output data 110, an error data 112, a clock and data recovery circuit 114, an adaptor circuit 116, an oscillator 118, a phase interpolator 120, a previous data 122, a decision feedback DAC 124, ISI injects 126, according to one embodiment. The input data 102 may be an analog input consisting of two terminals that may be isolated from computer ground, whose difference may be measured. The decision feedback equalization data 104 may be fed to the data latch 106 to remove a post cursor intersymbol interference (ISI) of the input data 102.

The data latch 106 may be a data storage circuitry used to store information in sequential logic systems. The threshold data 108 may be a fixed value data associated with the error data 112. The threshold data 108 may be a positive value (e.g., +h) and/or a negative value (−h). The output data 110 may be data obtained from the data latch 106. The error data 112 may also be obtained from the data latch 106. The clock and data recovery circuit 114 may generate an optimum location to sample an input data based on the output data 110 and the error data 112.

The Adaptor circuit 116 may adjust the ISI injects based on the output data 110 and the error data 112. The oscillator 118 may be an electronic device used to generate an oscillating signal that may be based on a periodic event that may repeat at a constant rate. The phase interpolator 120 may be used to adjust a timing of a clock associated with the oscillator 118 based on a voltage. The decision feedback DAC 124 may be used to generate the DFE data 104 obtained through feeding the previous data scaled with the adaptive weights (e.g., and/or the threshold data 108). The ISI injects 126 may be adaptive weights applied to the previous data 122 adjusted by the adaptor circuit 116.

In example embodiment illustrated in FIG. 1, the input data 102 and the decision feedback equalization DFE data 104 (e.g., obtained through the feeding back the previous data 122 scaled with the ISI injects 126) may be fed to the data latch 106 to obtain the output data 110 and/or the error data 112.

In another example embodiment, a decision feedback equalization (DFE) system may remove the post cursor intersymbol interference (ISI) through feeding back previous data (e.g., the previous data 122) scaled with adaptive weights to the DFE system. A clock and data recovery circuit (e.g., a clock and data recovery circuit 114 of FIG. 1) of the DFE system (e.g., the DFE system 100) may generate an optimum location to sample the input data based on an output data (e.g., the output data 110) and an error data (e.g., the error data 112). An adaptor circuit (e.g., the adaptor circuit 116 of FIG. 1) of the DFE system may adjust the adaptive weights (e.g., adaptive weights are amounts of ISI injects of the previous data to the input data) based on the output data and the error data. A phase interpolator of the DFE system may adjust a timing (e.g., a timing obtained through the clock and data recovery circuit 114 controls sampling of the input data 102) of a clock based on a voltage controlled oscillator (VCO) (e.g., the oscillator 118 of FIG. 1).

Figure 2:
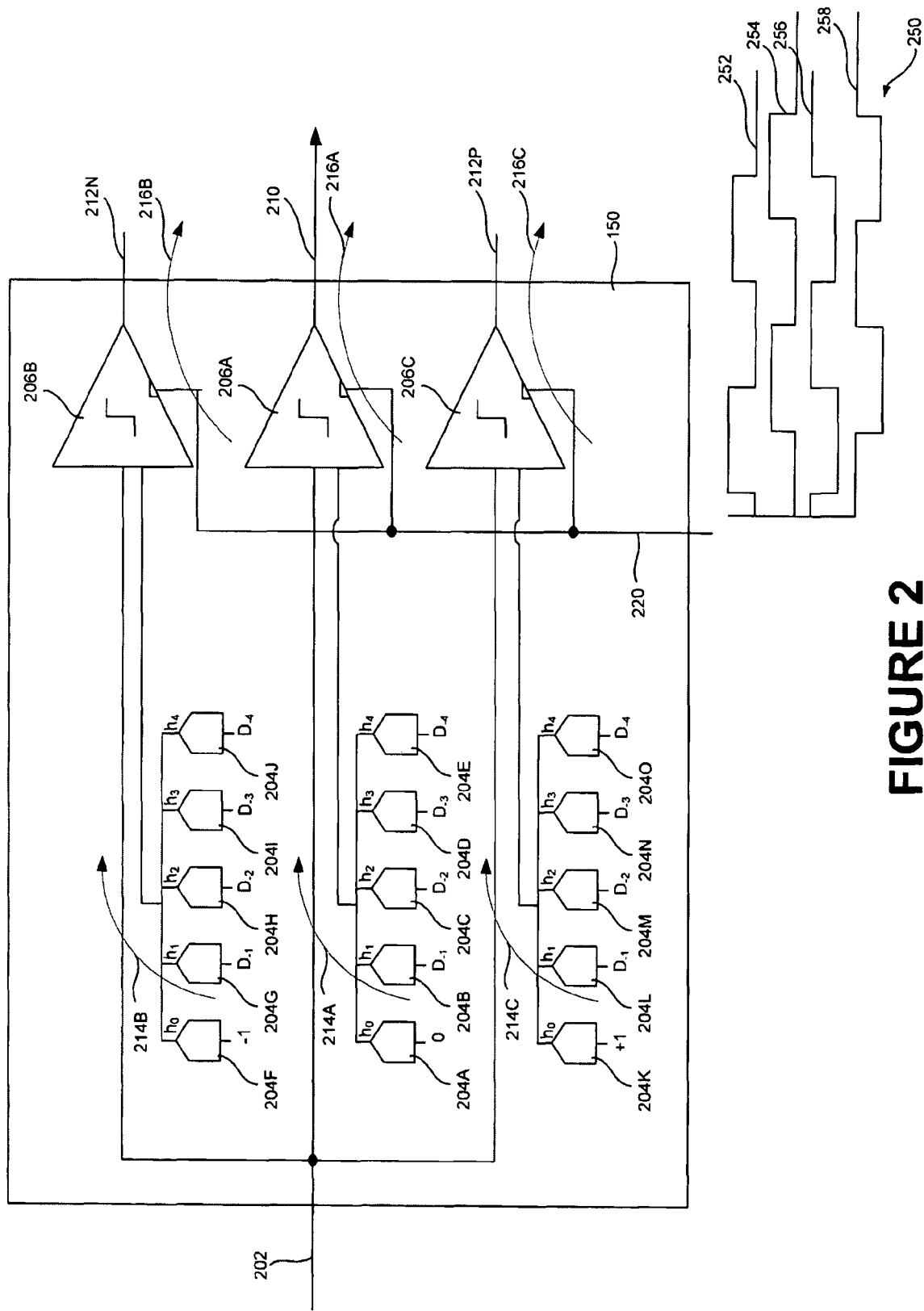
FIG. 2 is an exploded view of the decision feedback DACs and the data latch of FIG. 1, according to one embodiment.

FIG. 2 is an exploded view of the decision feedback DACs 124 and the data latch 106 of FIG. 1, according to one embodiment. Particularly, FIG. 2 illustrates a differential input data 202 (e.g., the input data 102), a first set of decision feedback DACs 204A-E, a second set of decision feedback DACs 204 F-J, a third set of decision feedback DACs 204K-O, data latches 206A-C, an output data 210, a positive error data 212P, a negative error data 212N, a settling time 214A-C, a latch clock delay 216A-C, a clock 220, a clock phase diagram 250, a clock phase 0 252, a clock phase 1 254, a clock phase 3 256, a clock phase 4 258, according to one embodiment.

The differential input data ($V_{IN}$, $V_{IP}$) 202 may be fed to an input terminal of the data latch 206A, data latch 206B and/or data latch 206C. The first decision feedback DAC 204A-E may generate the first DFE data through applying the adaptive weights to the previous data. The second decision feedback DAC 204F-J may generate the second DFE data through applying with the adaptive weights and/or a negative threshold value to the previous data. The third decision feedback DAC 204K-O may generate the third DFE data through applying the adaptive weights and the positive threshold value to the previous data.

The data latch 206 may be a data storage device used to store information in sequential logic systems. The output data 210 may be obtained through subtracting the DFE voltage based on the previous data from the differential input data 202 in the data latch 206A. The negative error data 212N may be obtained through subtracting the DFE voltage based on the previous data and the negative threshold value from the differential input voltage in the data latch 206B. The positive error 212P may be obtained through subtracting the DFE voltage based on the previous data and the positive threshold value from the differential input voltage in the data latch 206C. The settling time 214 may be a length of delay required by the decision feedback DACs 204. The latch clock delay 216 may be a delay required by the data latch 206. The clock 220 may be a voltage controlled oscillator (VCO) having a 1.6 GHz ring oscillator.

The clock phase diagram 250 may represent 4 clock signals of four parallel DFE circuits with each of the four parallel DFE circuits to recover the differential input data 202 in 6.4 giga-bits per second (GB/s). The clock phase diagram 250 may represent a timing of the clock 220 in the four parallel DFE circuits, where the phase of the clock 220 may be delayed or preceded by one tap clock rate between any two adjacent circuits of the four parallel DFE circuits.

In one example embodiment illustrated in FIG. 2, a first DFE data (e.g., of the DFE data 104) may be generated through applying the adaptive weights (e.g., the ISI injects 126) to a first set of decision feedback digital to analog converters (DACs) 204A-E. An output data (e.g., the output data 210) of the each slice may be generated by a first data latch (e.g., the data latch 206A) through applying the first DFE data to an input data (e.g., the differential input data 202) of the each slice in the first data latch to remove a first delay caused by performing the applying the first DFE data to the input data of the each slice outside of the first data latch. The input data may be a pseudo-differential input to reject a DC common-mode voltage and/or a fully-differential input to reject the DC common-mode voltage and/or a dynamic common-mode voltage.

Moreover, a second DFE data may be generated through applying the adaptive weights (e.g., the ISI injects 126) and/or a negative threshold value (e.g., $-h_0$) to the previous data (e.g., using a second set of decision feedback DACs). A negative error data (e.g., the negative error data 212N) of the each slice may be generated through applying the second DFE data to the input data of the each slice in the second data latch to remove a second delay caused by performing the applying the second DFE data to the input data outside of the second data latch.

Furthermore, a third DFE data may be generated through applying the adaptive weights and/or a positive threshold value (e.g., $+h_0$) to the previous data. A positive error data (e.g., the positive error data 212P) of the each slice may be generated by a third data latch through applying the third DFE data from the input data of the each slice in the third data latch to remove a third delay caused by performing the applying the third DFE data to the input data outside of the third data latch. An average power consumption of the DFE system may be lowered by 2 to 3 mili-volts per each of the first data latch, the second data latch, and/or the third data latch when compared to a DFE system with additional circuits to perform the applying the first DFE data, the second DFE data, and/or the third DFE data to the input data (e.g., using a summing and/or a subtraction stage outside of the data latches).

Figure 3:
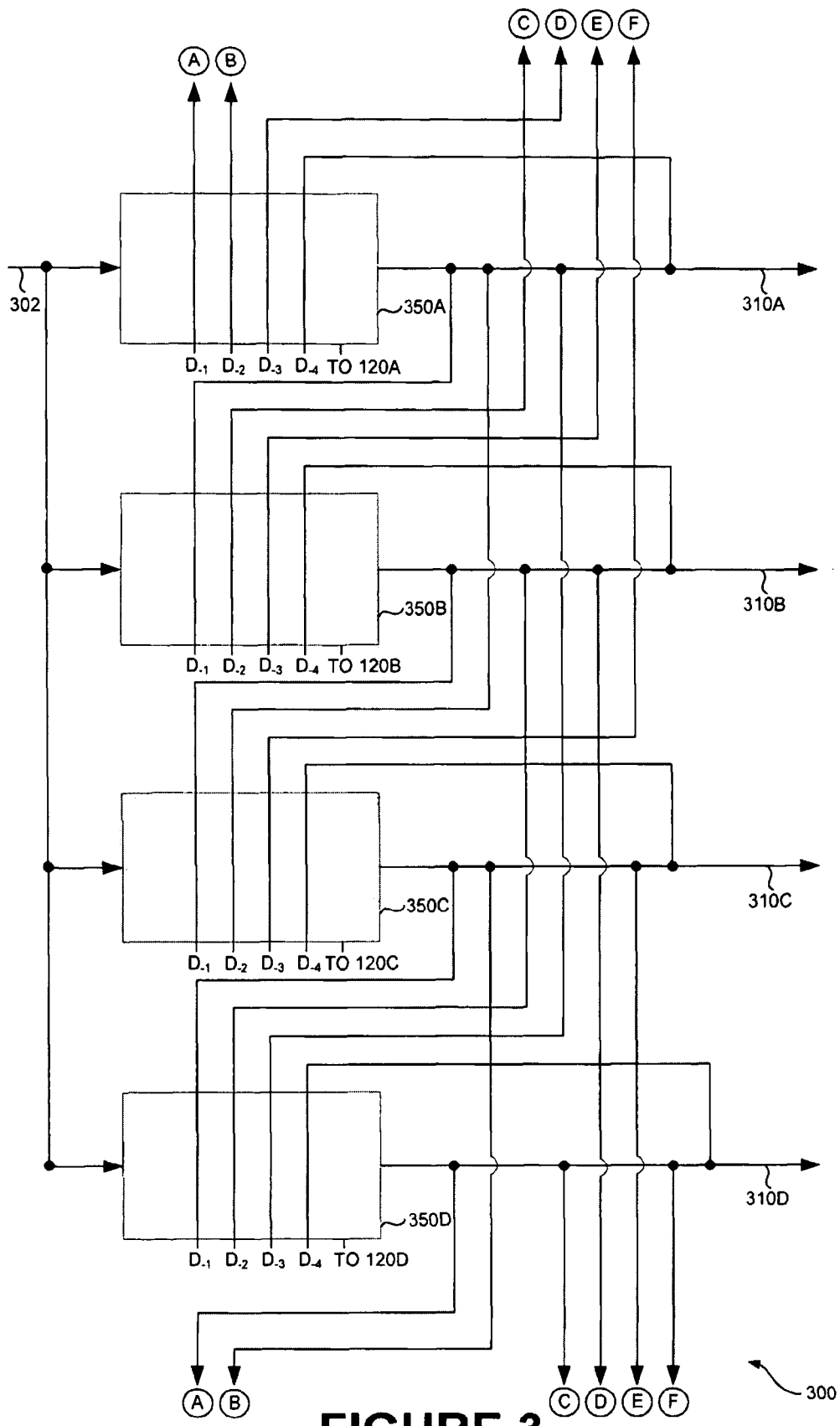
FIG. 3 is a circuit diagram of the DFE system of FIG. 1 having four parallel DFE circuits, according to one embodiment.

FIG. 3 is a circuit diagram of the DFE system of FIG. 1 having four parallel DFE circuits, according to one embodiment. Particularly, FIG. 3 illustrates a differential input data ($V_{IN}$, $V_{IP}$) 302, output data 310A-D, and data latches each having decision feedback DACs 350A-D, according to one embodiment. The differential input data ($V_{IN}$, $V_{IP}$) 302 may be a pseudo-differential input to reject the DC common-mode voltage and/or a fully-differential input to reject the DC common-mode voltage and/or the dynamic common-mode voltage. The output data 310 may be generated from the data latches each having the decision feedback DACs 350A-D. The data latches each having the decision feedback DACs may process the differential input data 302 and previous data (e.g., $D_{-1}$, $D_{-2}$, $D_{-3}$, and/or $D_{-4}$) to generate the output data 310 (e.g., and/or error data).

In one example embodiment illustrated in FIG. 3, a DFE system (e.g., the DFE system 300) may include four parallel DFE circuits (e.g., the four parallel DFE circuits 350A-D) with each of the four parallel DFE circuits that may recover the input data (e.g., the differential input data 302) in 6.4 giga-bits per second (GB/s) with the VCO of the each slice to have a 1.6 GHz ring oscillator. The timing of the clock may be delayed by one tap clock rate between any two adjacent circuits of the four parallel DFE circuits.

Figure 4:
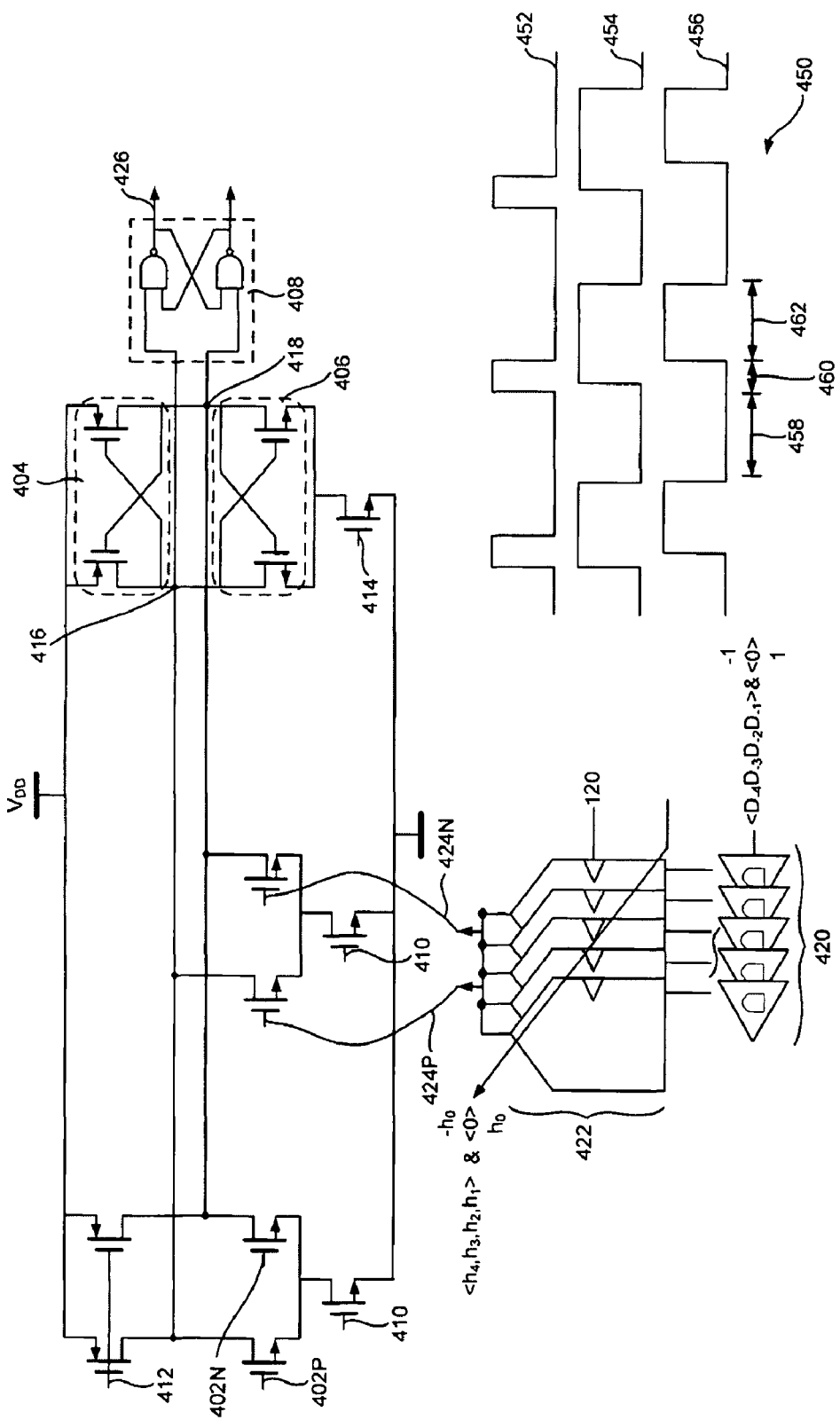
FIG. 4 is a circuit diagram of a data latch circuit having a subtraction (e.g., and/or summing) capacity, according to one embodiment.

FIG. 4 is a circuit diagram of a data latch circuit having a subtraction (e.g., and/or summing) capacity, according to one embodiment. Particularly, FIG. 4 illustrates a differential input voltage (402N, 402P) (e.g., the input data 102, the differential input data 202, and/or the differential input data 302), a cross-coupled PMOS pair 404, a cross-coupled NMOS pair 406, a S-R latch 408, a clock 1 410, a clock 2 412, a clock 3 414, a node A 416, a node B 418, a previous data 420, decision feedback DACs 422, a DFE voltage (424 N, 424 P), a signal data 426, a clock phase diagram 450, a clock signal 1 452, a clock signal 2 454, a clock signal 3 456, a stage 1-3 458-462, according to one embodiment. The differential input voltage 402 may provide input signal to the gates of a two parallel NMOS pairs.

The cross-coupled PMOS pair 404 may generate a positive feedback to the two parallel NMOS pair and/or another NMOS pair during the second stage. The cross-coupled NMOS pair 406 may escalate the positive feedback during a third stage of the clocking of the data latch. The S-R latch 408 may generate the signal data based on the positive feedback.

The clock 1 410, the clock 2 412, and the clock 3 414 may be represented by the clock signal 1, 452, the clock signal 2 454, and the clock signal 3 456, respectively. The node A 416 and the node B 418 may be two inputs to the S-R latch 408. The previous data 420 may be the signal data 426 generated from the DFE system feeding back to the decision feedback DACs 422. The DFE voltage 424 may be obtained through applying adaptive weights based on the signal data 426 and error data to the previous data 420. The signal data 426 may be obtained through subtracting the DFE voltage 424 from the differential input voltage 402. The clock phase diagram 450 may represent the clock signals (e.g., the clock signal 1 452, the clock signal 2 454, and the clock signal 3 456) of the three clocks (e.g., the clock 1 410, the clock 2 412, and the clock 3 414) in time domain. In the stage 1 458, the clock signal 1, the clock signal 2, and the clock signal 3 are low. In the stage 2 460, the clock signal 1 452 and the clock signal 2 454 are high while the clock signal 3 456 is low. In the stage 3 462, the clock signal 1 452 is low while the clock signal 2 454 and the clock signal 3 456 are high.

In one example embodiment illustrated in FIG. 4, at the stage 1 458, the node A 416 and the node B 418 may be pre-charged to a chipset voltage (e.g., a $V_{DD}$), when the PMOS pair associated with the clock 2 412 (e.g., which is low during the stage 1 458) are turned on. At the stage 2 460, pre-charging of the node A 416 and the node B 418 may be stopped (e.g., when the PMOS pair associated with the clock 2 412 are turned off). In addition, the NMOS pair associated with the differential input voltage 402 and another NMOS pair associated with the decision feedback DACs 422 will start sinking current basing on the differential input voltage 402 and the DFE voltage 424, respectively. Furthermore, the cross-coupled PMOS pair 404 may offer a positive feedback to any of the node A 416 and the node B 418. At the stage 3 462, the cross-coupled NMOS pair may intensify (e.g., offer more) the positive feedback, thus causing a differential voltage swing at the node A 416 and the node B 418 to the maximum.

When the differential input voltage 402 is over a minimal input sensitivity (e.g., a threshold value such as 0.3 volt) at a moment of sampling (e.g., the differential input voltage 402), the signal data 426 may be hard limited to the maximum swing. Also, the current sinking at the node A 416 and the current sinking at the node B 418 may at a start of the stage 2 460 may dictate the signal data 426. Accordingly, introducing of two more sinking current sources (e.g., the another NMOS pair associated with the DFE voltage 424) in the data latch and summing (e.g., and/or a subtraction) of the two more sinking current sources to two already existing sinking current sources (e.g., the NMOS pair associated with the differential input voltage 402) may be equal to first summing the two voltages (e.g., the differential input voltage 402 and the DFE voltage 424) outside of the data latch and sampling a resulting voltage based on the summing using the data latch.

In another example embodiment, the signal data 426 may be an output data obtained through subtracting the DFE voltage 424 from the differential input voltage 402. The signal data may also be a negative error data obtained through subtracting the DFE voltage 424 and a negative threshold voltage from the differential input voltage 402. In addition, the signal data 426 may be a positive error data through subtracting the DFE voltage 424 and a positive threshold voltage from the differential input voltage 402. Moreover, a first current induced by the input data and a second current induced by the DFE voltage may be integrated (e.g., rather than just being added) during the second stage.

Figure 5:
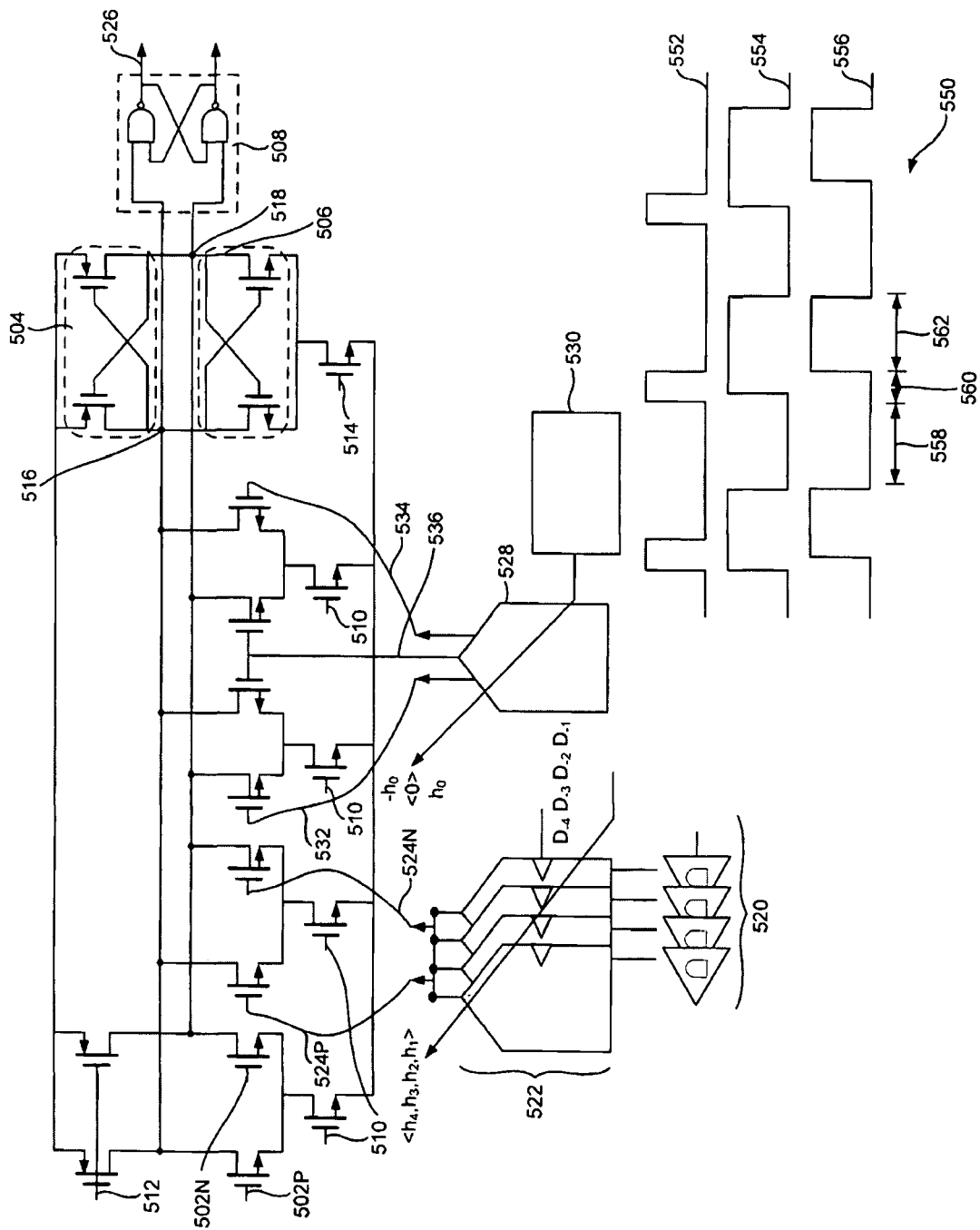
FIG. 5 is a circuit diagram of a data latch circuit having a separate decision feedback DAC to generate a threshold voltage, according to one embodiment.

FIG. 5 is a circuit diagram of a data latch circuit having a separate decision feedback DAC to generate a threshold voltage, according to one embodiment. Particularly, FIG. 5 illustrates a differential input voltage (502N, 502P) (e.g., the input data 102, the differential input data 202, and/or the differential input data 302), a cross-coupled PMOS pair 504, a cross-coupled NMOS pair 506, a S-R latch 508, a clock 1 510, a clock 2 512, a clock 3 514, a node A 516, a node B 518, a previous data 520, decision feedback DACs 522, a DFE voltage (524 N, 524 P), a signal data 526, a threshold decision feedback DAC 528, an adaptor circuit 530, a positive threshold voltage (e.g., +h) 532, a common mode threshold voltage (e.g., 0 volt) 534, and a negative threshold voltage (e.g., –h), a clock phase diagram 550, a clock signal 1 552, a clock signal 2 554, a clock signal 3 556, a stage 1-3 558-562, according to one embodiment.

The threshold decision feedback DAC 528 may generate the threshold decision feedback voltage (e.g., the positive threshold voltage 532, the common mode threshold voltage 534, and the negative threshold voltage 536). The adaptor circuit 530 may adjust the adaptive weights based on the signal data 526 (e.g., the output data 210, the negative error data 212N, and/or the positive error data 212P of FIG. 2), in which the adaptive weights are amounts of ISI injects of the previous data 520 to the differential input voltage 402. The positive threshold voltage 532 and/or the negative threshold voltage 536 may be determined by the adaptor circuit 530 (e.g., where the common mode threshold voltage is 0 volt). The remaining elements may be equivalent to those of FIG. 4.

Figure 6:
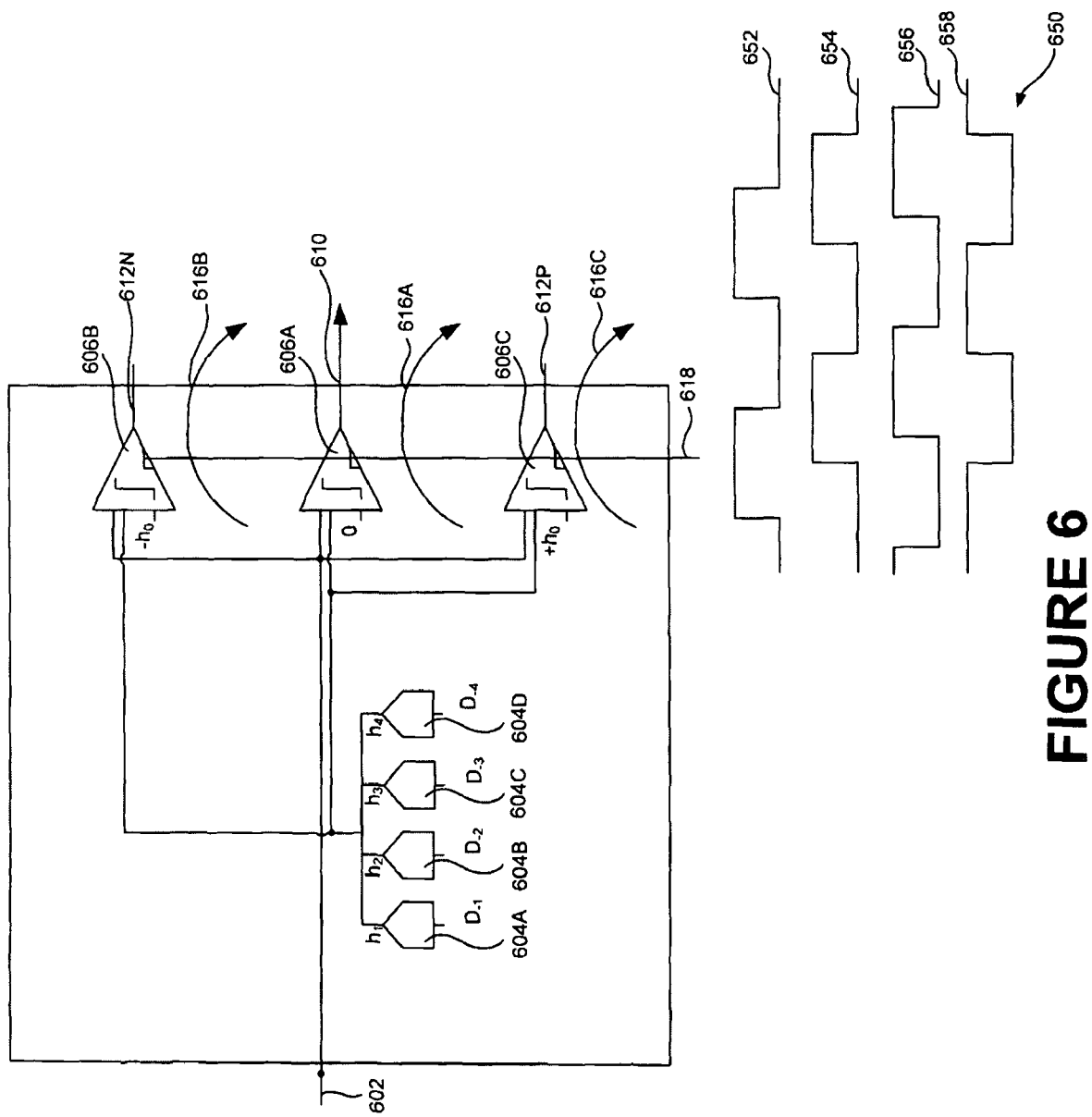
FIG. 6 is a partial diagram of a decision feedback equalization circuit with a reduced number of decision feedback DACs, according to one embodiment.

FIG. 6 is a partial diagram of a decision feedback equalization circuit with a reduced number of decision feedback DACs 604, according to one embodiment. Particularly, FIG. 6 illustrates a differential input data 602, decision feedback DACs 604, data latches 606, an output data 610, a negative error data 612N, a positive error data 612P, and a latch clock delay 616, according to one embodiment.

The differential input data 602 may be a pseudo-differential input to reject the DC common-mode voltage and/or a fully-differential input to reject the DC common-mode voltage and/or the dynamic common-mode voltage. The decision feedback DACs 604 may be a set of decision feedback DACs to generate DFE data fed to the data latch 606. The data latch 606 may be a data storage circuitry used to store information in sequential logic systems. The output data 610, the negative error data 612N, and the positive error data 614P may based on the differential input data 602, the DFE voltage and a threshold data (e.g., +h, 0, –h). The latch clock delay 616 may a delay created by the data latch 606.

In example embodiment illustrated in FIG. 6, the decision feedback DACs 604 generating the DFE data may be shared by the data latch 606A generating the output data 610 and the data latches 606A/606B generating the error data 612 such that a power consumption of the DFE system may be decreased by about 20 percent when compared to another DFE system which does not share its DFE DACs. Also, a die space of the DFE system may be reduced by at least 5% by removing at least 50% of the DFE DACs of the DFE system (e.g., when the DFE DACs are shared by the data latch 606A and the data latches 606B/606C).

Figure 7:
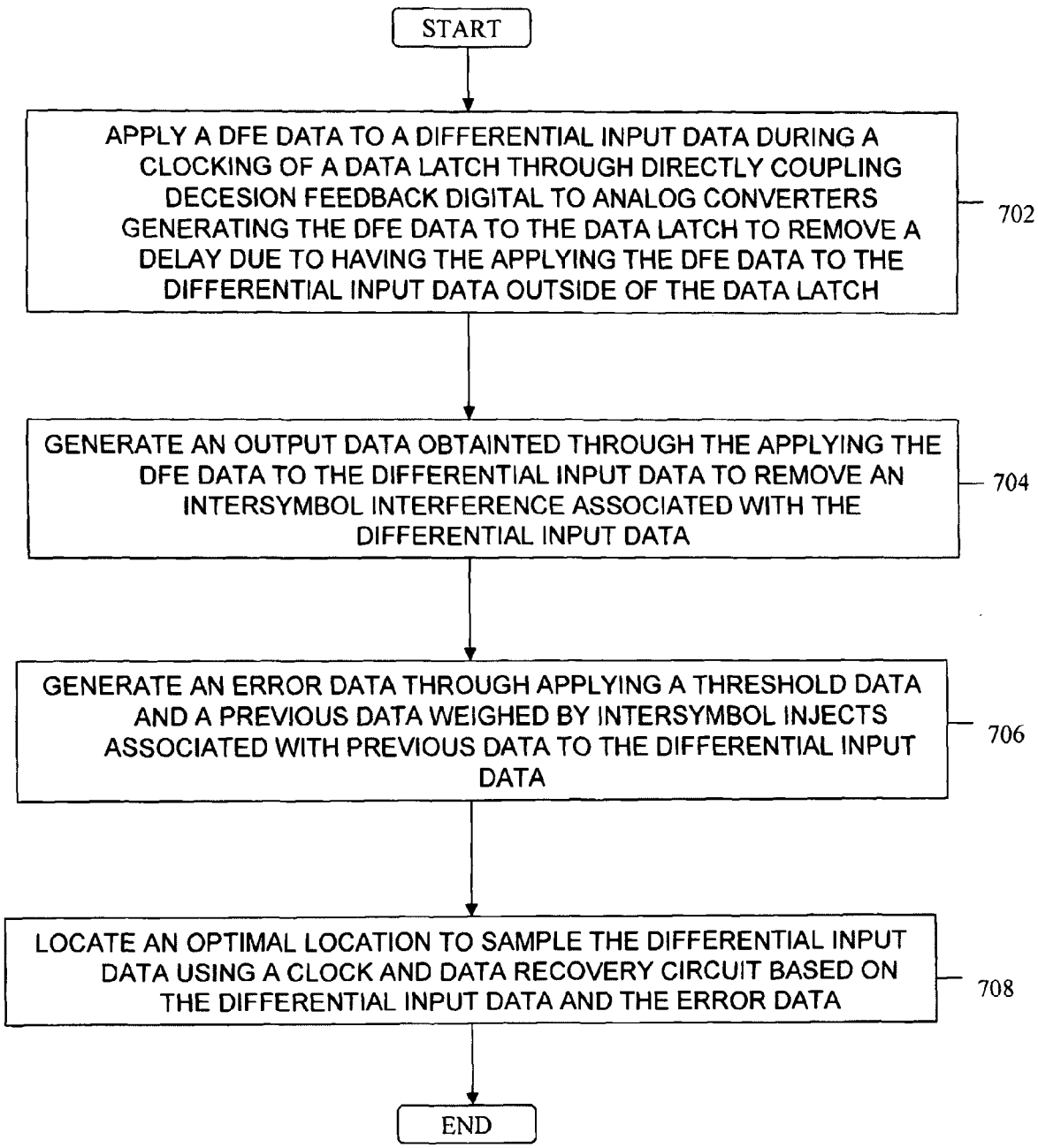
FIG. 7 is a process flow of lowering a power consumption of a decision feedback equalization system through applying a DFE data to a differential input data in a data latch, according to one embodiment.

FIG. 7 is a process flow of lowering a power consumption of a decision feedback equalization system through applying a DFE data to a differential input data in a data latch, according to one embodiment. In operation 702, the DFE data may be applied to the differential input data during a clocking of a data latch through directly coupling decision feedback digital to analog converters generating the DFE data to the data latch to remove a delay due to having the applying a decision feedback equalization data to the differential input data outside of the data latch.

In operation 704, an output data may be generated through the applying the decision feedback equalization data to the differential input data to remove an intersymbol interference associated with the differential input data. In operation 706, an error data may be generated through applying a threshold data and a previous data weighed by ISI injects associated with the previous data to the differential input data. In operation 708, an optimal location to sample differential input data may be located using a clock and a data recovery circuit based on the differential input data and the error data.

In addition, it will be appreciated that the various operations, processes, and methods disclosed herein may be embodied in a machine-readable medium and/or a machine accessible medium compatible with a data processing system (e.g., a computer system), and may be performed in any order. Accordingly, the specification and drawings are to be regarded in an illustrative rather than a restrictive sense.

What is claimed is:

1. A decision feedback equalization (DFE) system to remove a post cursor intersymbol interference (ISI), with each slice of the DFE system, comprising:

a first set of decision feedback digital to analog converters (DACs) to generate a first DFE data through applying adaptive weights to previous data;

a first data latch to generate an output data of the each slice through applying the first DFE data to an input data of the each slice in the first data latch to remove a first delay caused by performing the applying the first DFE data to the input data of the each slice outside of the first data latch;

a second set of decision feedback DACs to generate a second DFE data through applying the adaptive weights and a negative threshold value to the previous data;

a second data latch to generate a negative error data of the each slice through applying the second DFE data to the input data of the each slice in the second data latch to remove a second delay caused by performing the applying the second DFE data to the input data outside of the second data latch;

a third set of decision feedback DACs to generate a third DFE data through applying the adaptive weights and a positive threshold value to the previous data;

a third data latch to generate a positive error data of the each slice through applying the third DFE data from the input data of the each slice in the third data latch to remove a third delay caused by performing the applying the third DFE data to the input data outside of the third data latch;

a clock and a data recovery circuit to generate an optimum location to sample the input data based on the output data, the negative error data, and the positive error data;

an adaptor circuit to adjust the adaptive weights based on the output data, the negative error data, and the positive error data, wherein the adaptive weights are amounts of ISI injects of the previous data to the input data; and a phase interpolator to adjust a timing of a clock based on a voltage controlled oscillator (VCO), wherein the timing obtained through the clock and the data recovery circuit controls sampling of the input data, wherein an average power consumption of the DFE system is lowered by 2 to 3 mili-watts per each of the first data latch, the second data latch, and the third data latch when compared to a DFE system with additional circuits to perform the applying the first DFE data, the second DFE data, and the third DFE data to the input data.

2. The DFE system of claim 1 wherein the input data is at least one of a pseudo-differential input to reject a DC common-mode voltage and a fully-differential input to reject a DC common-mode voltage and a dynamic common-mode voltage.

3. The DFE system of claim 1 wherein the DFE system is comprised of four parallel DFE circuits with each of the four parallel DFE circuits is based on the each slice to recover the input data in 6.4 giga-bits per second (GB/s) with the VCO of the each slice of the four parallel circuits_to have a 1.6 GHz ring oscillator.

4. The DFE system of claim 3 wherein the timing of the clock is delayed by one tap clock rate between any two adjacent circuits of the four parallel DFE circuits.

5. A method of a decision feedback equalization (DFE) system, comprising:
applying a DFE data to a differential input data during a clocking of a data latch through directly coupling decision feedback digital to analog converters generating the DFE data to the data latch to remove a delay due to having the applying the DFE data to the differential input data outside of the data latch; and
generating an output data obtained through the applying the decision feedback equalization data to the differential input data to remove an intersymbol interference associated with the differential input data;
generating an error data through applying a threshold data and a previous data weighed by ISI injects associated with previous data to the differential input data; and
locating an optimal location to sample the differential input data using a clock and data recovery circuit based on the differential input data and the error data,
wherein DFE digital to analog converters (DACs) generating the DFE data are shared by the data latch generating the output data and another data latch generating the error data such that a power consumption of the DFE system is decreased by at least 20 percent.

6. The method of claim 5 wherein a die space of the DFE system is reduced by at least 5% by removing at least 50% of the DFE DACs of the DFE system.

7. A decision feedback equalization (DFE) system to remove a post cursor intersymbol interference (ISI), with each slice of the DFE system, comprising:
a first set of decision feedback digital to analog converters (DACs) to generate a first DFE data through applying adaptive weights to previous data;
a first data latch to generate an output data of the each slice through applying the first DFE data to an input data of the each slice in the first data latch to remove a first delay caused by performing the applying the first DFE data to the input data of the each slice outside of the first data latch;
a second set of decision feedback DACs to generate a second DFE data through applying the adaptive weights and a negative threshold value to the previous data;
a second data latch to generate a negative error data of the each slice through applying the second DFE data to the input data of the each slice in the second data latch to remove a second delay caused by performing the applying the second DFE data to the input data outside of the second data latch;
a third set of decision feedback DACs to generate a third DFE data through applying the adaptive weights and a positive threshold value to the previous data;
a third data latch to generate a positive error data of the each slice through applying the third DFE data from the input data of the each slice in the third data latch to remove a third delay caused by performing the applying the third DFE data to the input data outside of the third data latch;
a clock and a data recovery circuit to generate an optimum location to sample the input data based on the output data, the negative error data, and the positive error data;
an adaptor circuit to adjust the adaptive weights based on the output data, the negative error data, and the positive error data, wherein the adaptive weights are amounts of ISI injects of the previous data to the input data; and
a phase interpolator to adjust a timing of a clock based on a voltage controlled oscillator (VCO), wherein the timing obtained through the clock and the data recovery circuit controls sampling of the input data,
wherein an average power consumption of the DFE system is lowered by 2 to 3 mili-watts per each of the first data latch, the second data latch, and the third data latch when compared to a DFE system with additional circuits to perform the applying the first DFE data, the second DFE data, and the third DFE data to the input data,
wherein the DFE system is comprised of four parallel DFE circuits with each of the four parallel DFE circuits is based on the each slice to recover the input data in 6.4 giga-bits per second (GB/s) with the VCO of the each slice of the four parallel circuits to have a 1.6 GHz ring oscillator.

8. The DFE system of claim 7 wherein the input data is at least one of a pseudo-differential input to reject a DC common-mode voltage and a fully-differential input to reject a DC common-mode voltage and a dynamic common-mode voltage.

9. The DFE system of claim 7 wherein the timing of the clock is delayed by one tap clock rate between any two adjacent circuits of the four parallel DFE circuits.

10. A decision feedback equalization (DFE) system to remove a post cursor intersymbol interference (ISI), with each slice of the DFE system, comprising:
a first set of decision feedback digital to analog converters (DACs) to generate a first DFE data through applying adaptive weights to previous data;
a first data latch to generate an output data of the each slice through applying the first DFE data to an input data of the each slice in the first data latch to remove a first delay caused by performing the applying the first DFE data to the input data of the each slice outside of the first data latch;
a second set of decision feedback DACs to generate a second DFE data through applying the adaptive weights and a negative threshold value to the previous data;
a second data latch to generate a negative error data of the each slice through applying the second DFE data to the input data of the each slice in the second data latch to remove a second delay caused by performing the applying the second DFE data to the input data outside of the second data latch;
a third set of decision feedback DACs to generate a third DFE data through applying the adaptive weights and a positive threshold value to the previous data;
a third data latch to generate a positive error data of the each slice through applying the third DFE data from the input data of the each slice in the third data latch to remove a third delay caused by performing the applying the third DFE data to the input data outside of the third data latch;

a clock and a data recovery circuit to generate an optimum location to sample the input data based on the output data, the negative error data, and the positive error data;

an adaptor circuit to adjust the adaptive weights based on the output data, the negative error data, and the positive error data, wherein the adaptive weights are amounts of ISI injects of the previous data to the input data; and a phase interpolator to adjust a timing of a clock based on a voltage controlled oscillator (VCO), wherein the timing obtained through the clock and the data recovery circuit controls sampling of the input data, wherein an average power consumption of the DFE system is lowered by 2 to 3 mili-watts per each of the first data latch, the second data latch, and the third data latch when compared to a DFE system with additional circuits to perform the applying the first DFE data, the second DFE data, and the third DFE data to the input data, wherein the DFE system is comprised of four parallel DFE circuits with each of the four parallel DFE circuits is based on the each slice to recover the input data in 6.4 giga-bits per second (GB/s) with the VCO of the each slice of the four parallel circuits to have a 1.6 GHz ring oscillator, and wherein the timing of the clock is delayed by one tap clock rate between any two adjacent circuits of the four parallel DFE circuits.

11. The DFE system of claim 10 wherein the input data is at least one of a pseudo-differential input to reject a DC common-mode voltage and a fully-differential input to reject a DC common-mode voltage and a dynamic common-mode voltage.

12. A method of a decision feedback equalization (DFE) system, comprising:

applying a DFE data to a differential input data during a clocking of a data latch through directly coupling decision feedback digital to analog converters generating the DFE data to the data latch to remove a delay due to having the applying the DFE data to the differential input data outside of the data latch;

generating an output data obtained through the applying the decision feedback equalization data to the differential input data to remove an intersymbol interference associated with the differential input data;

generating an error data through applying a threshold data and a previous data weighed by ISI injects associated with previous data to the differential input data; and locating an optimal location to sample the differential input data using a clock and data recovery circuit based on the differential input data and the error data, wherein DFE digital to analog converters (DACs) generating the DFE data are shared by the data latch generating the output data and another data latch generating the error data such that a power consumption of the DFE system is decreased by at least 20 percent, and wherein a die space of the DFE system is reduced by at least 5% by removing at least 50% of the DFE DACs of the DFE system.

* * * * *